(12) United States Patent
Hayes

(10) Patent No.: US 11,807,030 B1
(45) Date of Patent: Nov. 7, 2023

(54) BOOK HOLDING ASSEMBLY

(71) Applicant: John Hayes, Santa Monica, CA (US)

(72) Inventor: John Hayes, Santa Monica, CA (US)

( * ) Notice: Subject to any disclaimer, the term of this patent is extended or adjusted under 35 U.S.C. 154(b) by 0 days.

(21) Appl. No.: 18/071,084

(22) Filed: Nov. 29, 2022

(51) Int. Cl.
*A47B 19/00* (2006.01)
*B42D 9/00* (2006.01)
*A47B 23/06* (2006.01)
*F16M 11/28* (2006.01)
*F16M 11/24* (2006.01)
*A47B 23/04* (2006.01)

(52) U.S. Cl.
CPC ............... *B42D 9/00* (2013.01); *A47B 19/00* (2013.01); *A47B 23/04* (2013.01); *A47B 23/06* (2013.01); *F16M 11/242* (2013.01); *F16M 11/28* (2013.01)

(58) Field of Classification Search
CPC ........... B42D 9/00; A47B 23/04; A47B 23/06; A47B 21/02; A47B 19/00; A47B 19/06; A47B 9/02; A47B 9/18; A47B 9/20
USPC ....... 248/443, 444, 445, 451–453, 455, 454, 248/448
See application file for complete search history.

(56) References Cited

U.S. PATENT DOCUMENTS

| | | | | |
|---|---|---|---|---|
| 498,156 A | * | 5/1893 | Condit et al. .......... | A47B 23/04 248/446 |
| 556,650 A | * | 3/1896 | Smith et al. ......... | A47B 23/042 248/448 |
| 841,953 A | * | 1/1907 | Fitz Simmons ....... | A47B 23/04 248/458 |
| 1,308,348 A | * | 7/1919 | Ericsson .................. | B42D 9/06 84/508 |
| 1,649,217 A | * | 11/1927 | Eshleman ............ | A47B 23/004 248/444 |
| 1,653,657 A | * | 12/1927 | Pretsch ................ | A47B 23/046 108/146 |
| 2,601,047 A | * | 6/1952 | Merrion ................... | B42D 9/06 84/487 |
| 2,670,228 A | * | 2/1954 | Pagliuso ................ | F16M 11/14 285/267 |
| 3,351,312 A | * | 11/1967 | Ballas .................. | A47B 23/007 248/447.1 |
| 3,371,571 A | * | 3/1968 | Barbera .................... | B42D 9/06 84/502 |
| 3,514,066 A | * | 5/1970 | Henley .................. | A47B 23/02 248/463 |

(Continued)

FOREIGN PATENT DOCUMENTS

WO WO2014008872 1/2014

*Primary Examiner* — Nkeisha Smith

(57) ABSTRACT

A book holding assembly includes a tripod has a plurality of legs collapsibly disposed on a central pole of the tripod. A cup is coupled the central pole and the cup is directed upwardly on the central pole. A book holder is pivotally attached to the cup thereby facilitating the book holder to be positioned at a variety of orientations. The book holder is adjustable to grip a book thereby facilitating the book to be positioned in a preferred orientation for reading to facilitate a user to read the book in a hands-free manner. The book holder has a flexible page holder extending away from the book holder. The flexible page holder is bendable into a variety of shapes thereby facilitating each of the flexible page holder to be positioned against respective pages of the book for holding the respective pages in a reading position.

9 Claims, 8 Drawing Sheets

(56) References Cited

U.S. PATENT DOCUMENTS

| | | | | |
|---|---|---|---|---|
| 4,275,863 A | * | 6/1981 | Hartman | A47B 19/00 248/452 |
| 4,395,057 A | | 7/1983 | Young | |
| 4,463,651 A | * | 8/1984 | Hammer | B42D 9/00 84/504 |
| 4,512,542 A | * | 4/1985 | Black | B42D 9/00 248/460 |
| 4,882,969 A | * | 11/1989 | Ricca | B42D 9/08 84/487 |
| 5,069,409 A | | 12/1991 | Batson | |
| 5,114,110 A | * | 5/1992 | Vohora | A47B 23/043 248/160 |
| 5,165,722 A | * | 11/1992 | Wong | B42D 9/00 24/679 |
| 5,443,029 A | * | 8/1995 | Garnet | B42D 9/002 116/238 |
| 5,445,416 A | * | 8/1995 | Zareck | B42D 9/00 281/12 |
| 5,690,309 A | | 11/1997 | Blum | |
| 6,007,041 A | * | 12/1999 | Law | A47G 1/1646 248/490 |
| D421,063 S | | 2/2000 | Davidson | |
| 6,173,929 B1 | * | 1/2001 | LaPointe | F16M 11/16 248/407 |
| 7,237,756 B2 | | 7/2007 | Isenberg | |
| 7,757,624 B2 | * | 7/2010 | Landolt | B42D 9/001 116/234 |
| 7,819,618 B2 | * | 10/2010 | Frost | B65G 7/02 248/176.1 |
| 9,297,495 B2 | * | 3/2016 | Fischer | F16M 11/041 |
| 9,408,456 B2 | * | 8/2016 | Hart | A45F 5/021 |
| 9,420,712 B2 | * | 8/2016 | Yang | H05K 5/0204 |
| 9,504,300 B1 | | 11/2016 | Donahue | |
| 9,874,305 B2 | * | 1/2018 | Lowry | A63H 3/04 |
| 10,092,125 B1 | * | 10/2018 | Braunberger | A47G 33/12 |
| 10,322,764 B2 | * | 6/2019 | Thomas | F16C 11/106 |
| 10,323,785 B1 | * | 6/2019 | Takahashi | F16M 11/12 |
| 10,801,662 B2 | * | 10/2020 | Lebedev | F16M 13/02 |
| 10,808,884 B2 | * | 10/2020 | Shan | F16M 11/105 |
| 11,353,781 B2 | * | 6/2022 | Zou | F16M 11/242 |
| 2004/0107612 A1 | * | 6/2004 | Jung | B42D 9/04 40/343 |
| 2005/0016354 A1 | * | 1/2005 | Kent | F16M 11/28 84/327 |
| 2006/0175483 A1 | * | 8/2006 | Osaka | F16M 11/28 248/177.1 |
| 2007/0090264 A1 | | 4/2007 | MacLennan | |
| 2007/0152116 A1 | * | 7/2007 | Madsen | F16M 11/14 248/181.1 |
| 2010/0154860 A1 | * | 6/2010 | Fereday | F24S 25/61 248/124.2 |
| 2013/0001382 A1 | | 1/2013 | Jamg | |
| 2013/0009032 A1 | * | 1/2013 | Polletta | F16M 13/00 248/440.1 |
| 2014/0346306 A1 | * | 11/2014 | Mayfield | F16M 11/041 248/455 |
| 2017/0251793 A1 | * | 9/2017 | Barratt | F16M 11/28 |
| 2022/0218101 A1 | * | 7/2022 | Garcia | H04R 1/08 |
| 2023/0076389 A1 | * | 3/2023 | Olson | F16M 13/04 |

* cited by examiner

BOOK HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to holding devices and more particularly pertains to a new holding device for holding a book at eye level to facilitate the book to be read in a hands-free manner. The device includes a tripod and a book holder attached to the tripod which can hold a book in preferred orientation for reading. The book holder is collapsible for storage and the book holder includes a flexible page holder that can be bent around the book for holding pages of the book in a reading position.

(2) Description of Related Art Including Information Disclosed Under 37 CFR 1.97 and 1.98

The prior art relates to holding devices including a book holder that includes a member with a finger ring and a plurality of elastic bands extending away from the member that can be attached to a book. The prior art discloses a hand held book holder that includes a trough for holding a book, a rod extending along the trough and a clamp attached to the trough. The prior art discloses a book holder that includes a telescopic rod, a panel attached to the rod for supporting a book and a clamp attached to the panel for retaining the book on the panel. The prior art discloses a book holder that includes a strap that is attachable to a spine of a book and which includes a hand loop for extending around a user's hand. The prior art discloses a book stand that includes a triangular frame and a panel attached to the frame for supporting a book. The prior art discloses a book holder that includes a stand, a member with a foot for supporting a book, a pair of arms pivotally attached to the member and a pair of springs that can be positioned against pages of the book. The prior art discloses a book holder that includes a member which has a pair of clamps that engage opposite ends of a book and a stand pivotally attached to the member.

BRIEF SUMMARY OF THE INVENTION

An embodiment of the disclosure meets the needs presented above by generally comprising a tripod has a plurality of legs collapsibly disposed on a central pole of the tripod. A cup is coupled the central pole and the cup is directed upwardly on the central pole. A book holder is pivotally attached to the cup thereby facilitating the book holder to be positioned at a variety of orientations. The book holder is adjustable to grip a book thereby facilitating the book to be positioned in a preferred orientation for reading to facilitate a user to read the book in a hands-free manner. The book holder has a flexible page holder extending away from the book holder. The flexible page holder is bendable into a variety of shapes thereby facilitating each of the flexible page holder to be positioned against respective pages of the book for holding the respective pages in a reading position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
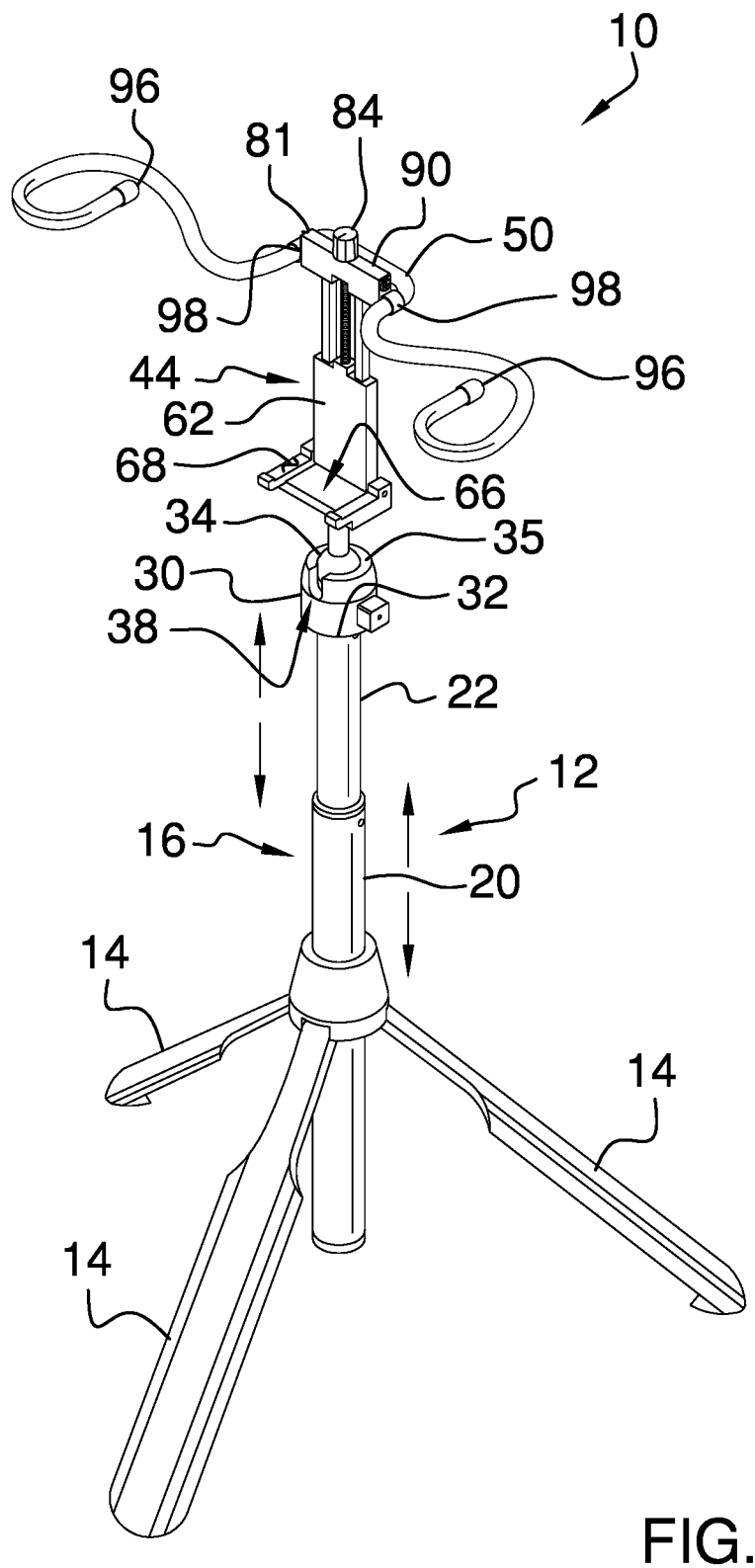
FIG. 1 is a front perspective view of a book holding assembly according to an embodiment of the disclosure.
Figure 2:
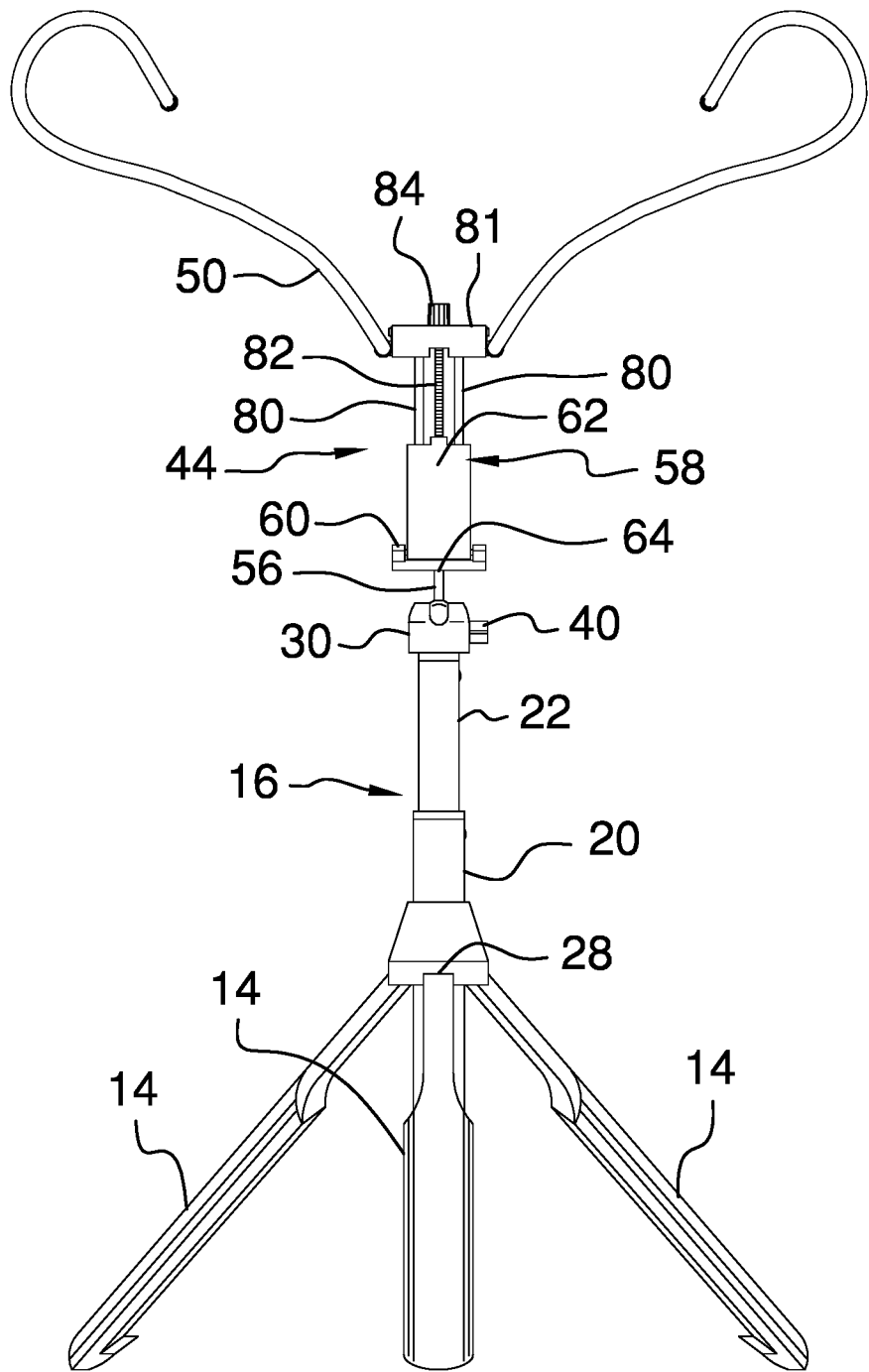
FIG. 2 is a front view of an embodiment of the disclosure showing a tripod in a deployed orientation.
Figure 3:
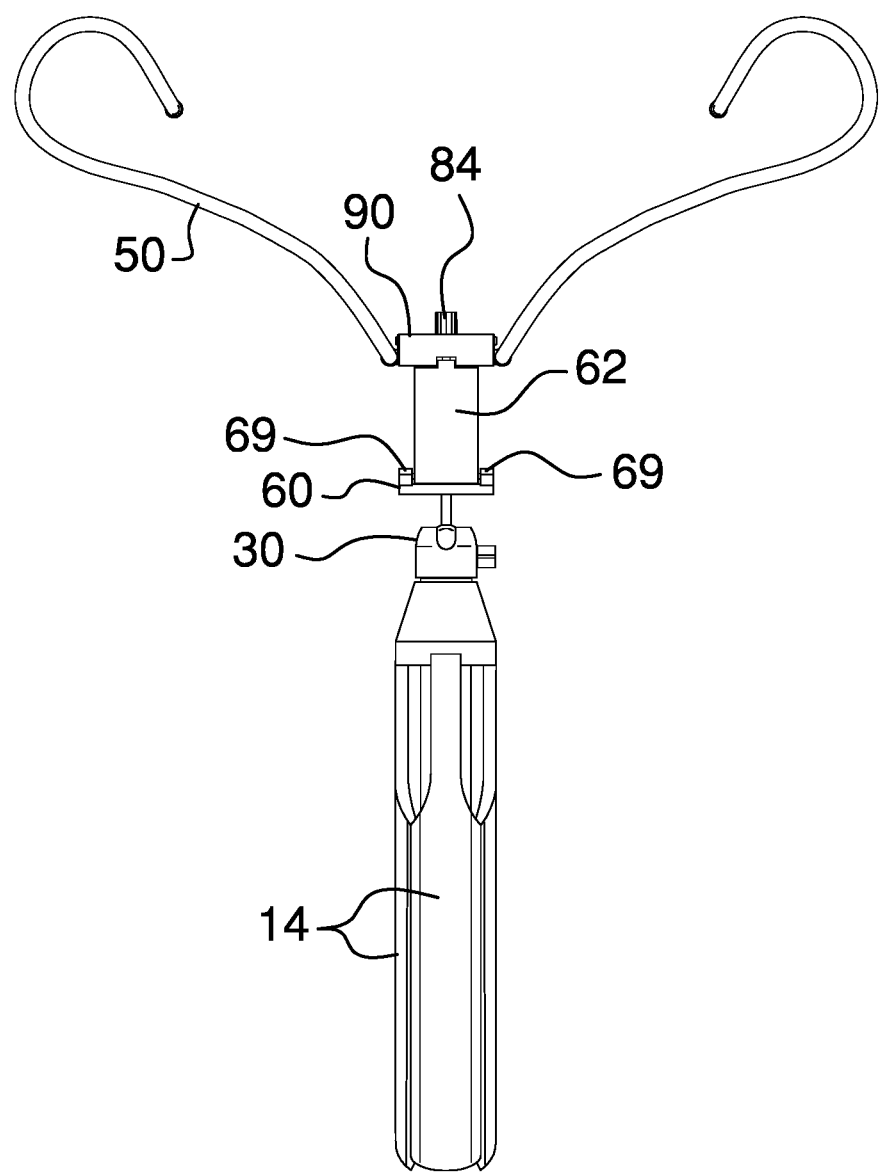
FIG. 3 is a front view of an embodiment of the disclosure showing a tripod in a collapsed orientation.
Figure 4:
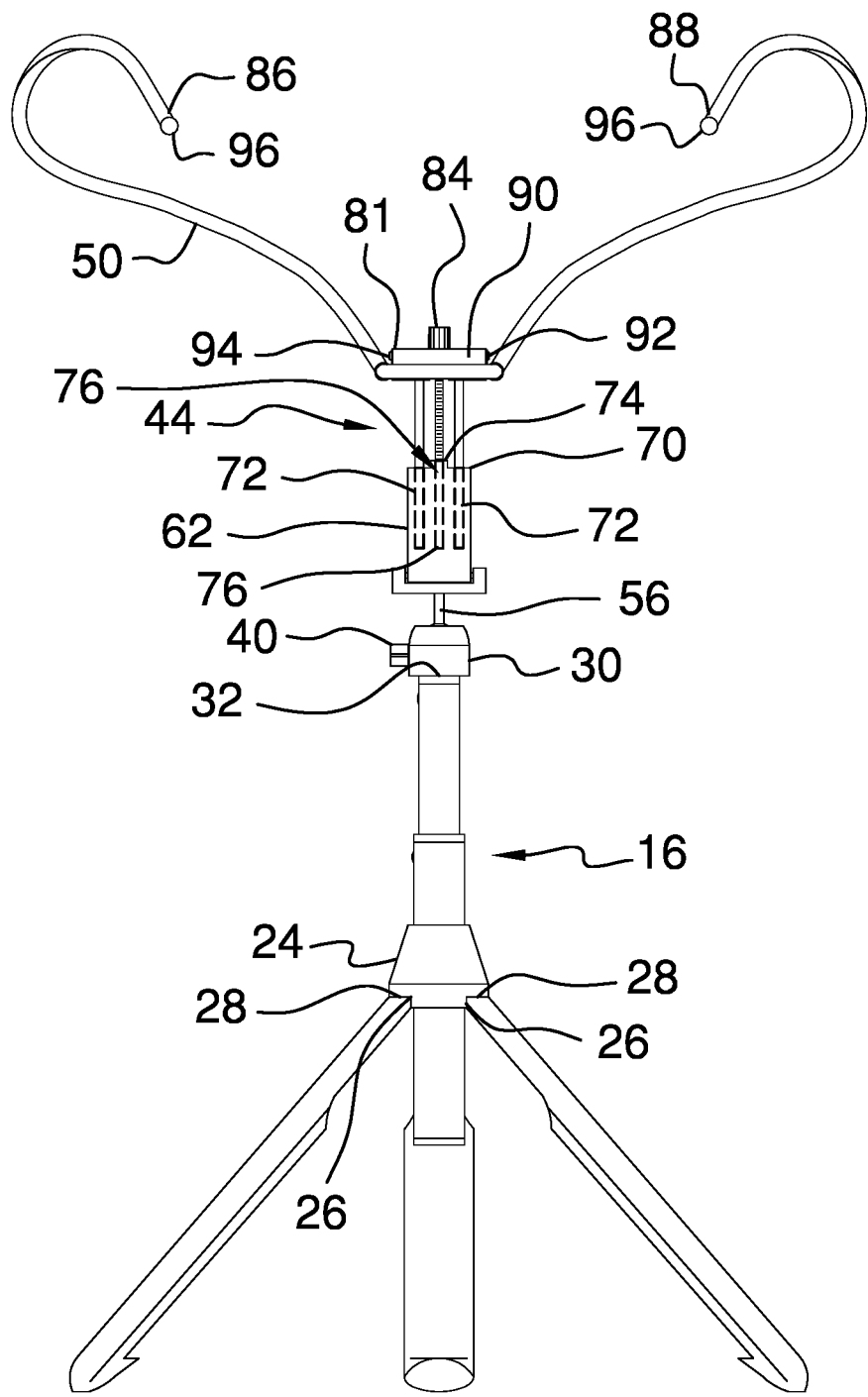
FIG. 4 is a back view of an embodiment of the disclosure.
Figure 5:
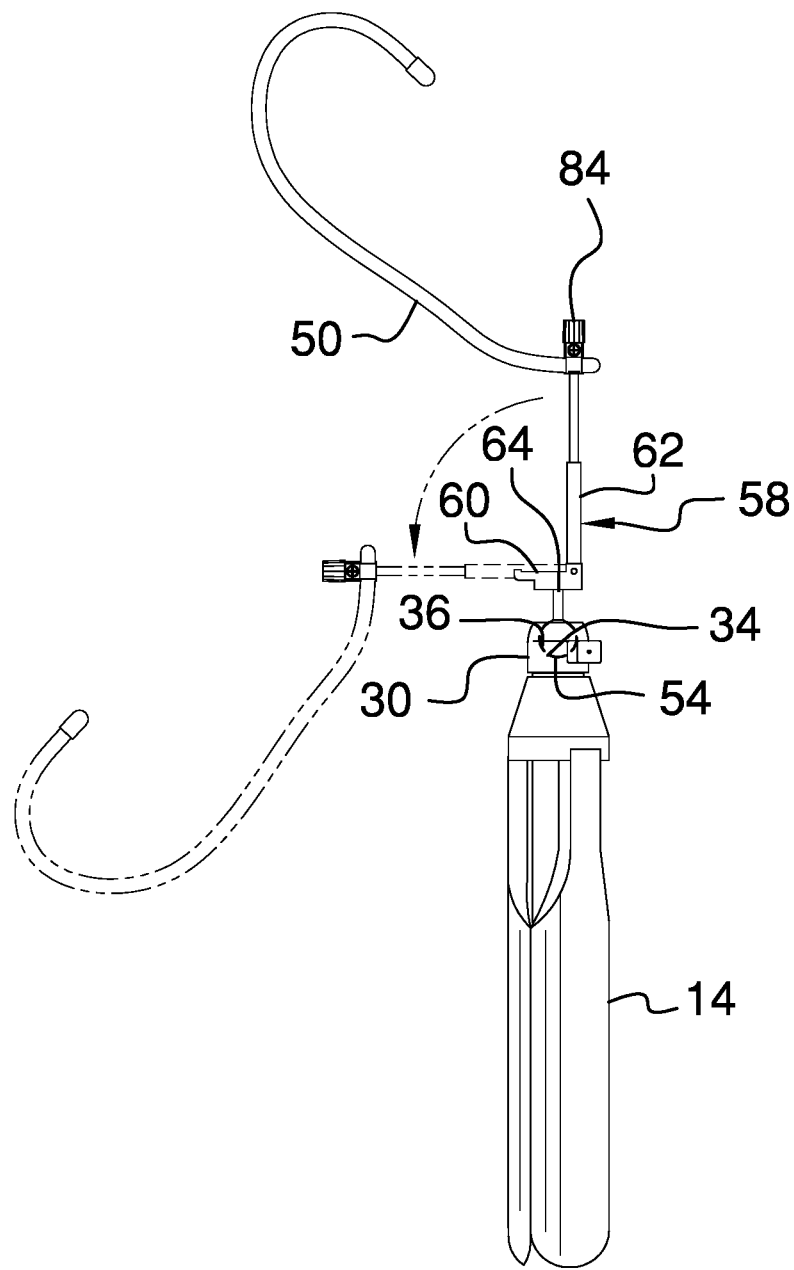
FIG. 5 is a left side view of an embodiment of the disclosure showing a book holder being positioned between a stored position and a deployed position.
Figure 6:
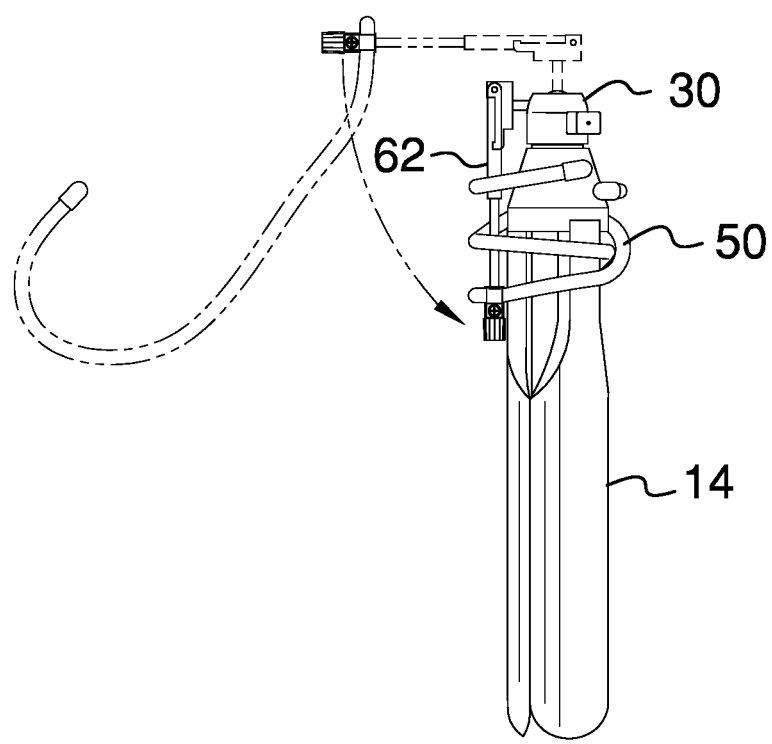
FIG. 6 is a left side view of an embodiment of the disclosure showing a flexible page holder being wrapped around a book holder.
Figure 7:
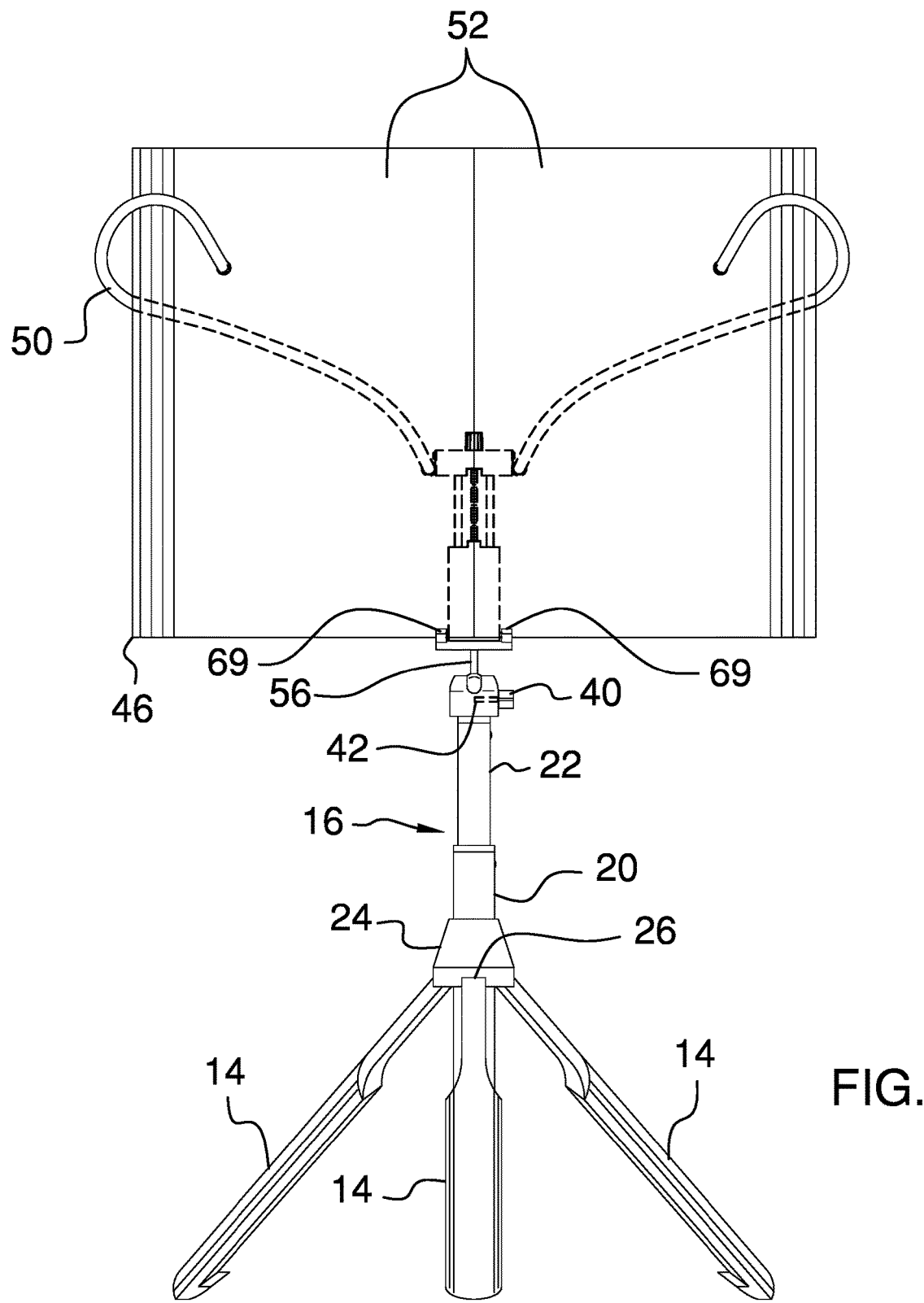
FIG. 7 is a front perspective in-use view of an embodiment of the disclosure showing a book positioned on a book holder.
Figure 8:
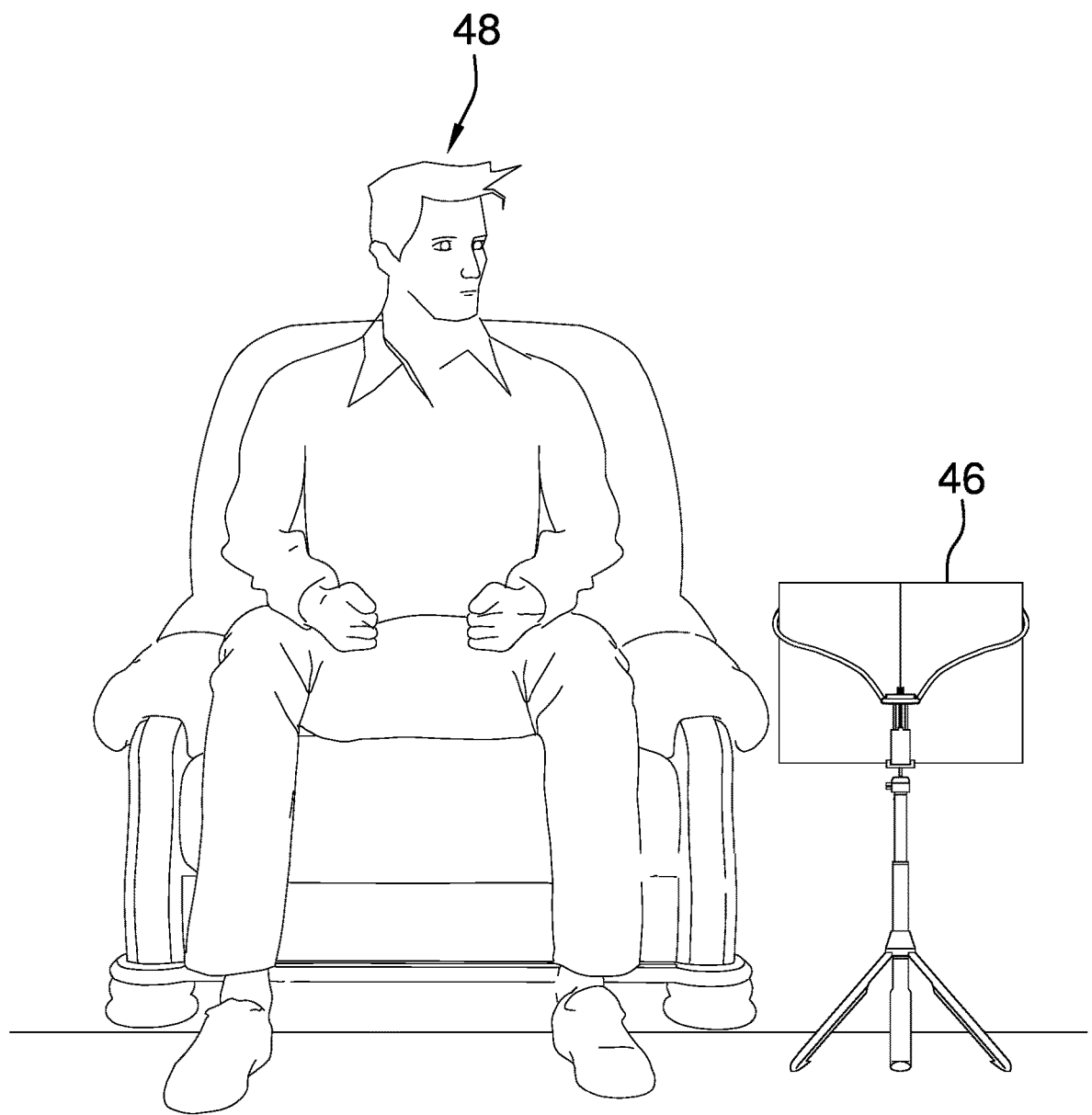
FIG. 8 is a perspective in-use view of an embodiment of the disclosure.

With reference now to the drawings, and in particular to FIGS. 1 through 8 thereof, a new holding device embodying the principles and concepts of an embodiment of the disclosure and generally designated by the reference numeral 10 will be described.

As best illustrated in FIGS. 1 through 8, the book holding assembly 10 generally comprises a tripod 12 that has a plurality of legs 14 and each of the plurality of legs 14 is collapsibly disposed on a central pole 16 of the tripod 12. Each of the plurality of legs 14 angles away from the central pole 16 when the plurality of legs 14 is positioned in a deployed position to facilitate the central pole 16 to be vertically oriented on a support surface 18. Conversely, each of the plurality of legs 14 rests against the central pole 16 when the plurality of legs 14 is positioned in a stored position. The central pole 16 comprises a tube 20 that slidably receives a shaft 22 such that the central pole 16 has a telescopically adjustable length. The tripod 12 has a collar 24 extending around the tube 20 and the collar 24 has a plurality of pivot points 26 distributed around the collar 24. Each of the legs 14 has an upper end 28 that is pivotally coupled to a respective one of the pivot points 26 on the collar 24. Furthermore, the collar 24 may be slidable along a substantial length of the tube 20 for positioning the legs 14 at a selected point along the tube 20.

A cup 30 is coupled the central pole 16 and the cup 30 is directed upwardly on the central pole 16. The cup 30 is disposed on a top end 32 of the shaft 22 having a depression 34 extending into and open end 35 of the cup 30 that is directed away from the shaft 22. The depression 34 has a bounding surface 36 that is concavely arcuate with the open end 35 such that the depression 34 has a hemispherical shape. The cup 30 has a slot 38 extending downwardly from the open end 35 toward the bottom of the cup 30 and the slot 38 extends into the depression 34.

A lock 40 is movably integrated into the cup 30 and the lock 40 extends into the depression 34 when the lock 40 is manipulated into a locking condition. Conversely, the lock 40 retracts out of the depression 34 when the lock 40 is manipulated into an unlocked condition. The lock 40 might include a screw 42 which extends into the cup 30 when the screw 42 is rotated in a tightening direction and which retracts outwardly from the cup 30 when the screw 42 is rotated in a loosening direction.

A book holder 44 is pivotally attached to the cup 30 thereby facilitating the book holder 44 to be positioned at a variety of orientations. Furthermore, the book holder 44 is adjustable to grip a book 46 thereby facilitating the book 46 to be positioned in a preferred orientation for reading. In this way the book holder 44 facilitates a user 48 to read the book 46 in a hands-free manner. The book holder 44 is collapsible into a stored position for storing the book holder 44. The book holder 44 has a flexible page holder 50 extending away from the book holder 44. The flexible page holder 50 is bendable into a variety of shapes thereby facilitating each of the flexible page holder 50 to be positioned against respective pages 52 of the book 46 for holding the respective pages 52 in a reading position.

The book holder 44 comprises a ball 54 that is positioned in the depression 34 in the cup 30 such that the ball 54 is rotatable in the cup 30. The book holder 44 includes a stem 56 that is coupled to and extends away from the cup 30. The stem 56 extends through the slot 38 in the cup 30 when the book holder 44 is collapsed into the stored position. The book holder 44 includes a grip 58 which has a base plate 60 and a gripping plate 62 that is pivotally attached to the base plate 60. The base plate 60 is attached to a distal end 64 of the stem 56 having the base plate 60 lying on a plane that is perpendicularly oriented with an axis extending through the distal end 64 of the stem 56 and the ball 54. Furthermore, the gripping plate 62 lies on a plane that is perpendicularly oriented with the base plate 60 when the book holder 44 is positioned in a deployed position. In this way the book 46 can be stood upon the base plate 60 having the book 46 resting against the gripping plate 62. The gripping plate 62 lies on the base plate 60 when the book holder 44 is collapsed into the stored position. The base plate 60 has a recess 66 extending into a top surface 68 of the base plate 60 and the gripping plate 62 is positioned in the recess 66 when the book holder 44 is positioned in the stored position.

The base plate 60 has a pair of feet 69 each extending upwardly from the top surface 68 of the base plate 60. Each of the feet 69 is positioned on opposite sides of the recess 66 from each other and each of the feet 69 is distally positioned with respect to the gripping plate 62 such that the pair of feet 69 inhibit the book 46 from sliding forwardly off of the top surface 68 of the base plate 60. The gripping plate 62 has an upper edge 70 and the gripping plate 62 has a pair of wells 72 each extending downwardly in the upper edge 70. The upper edge 70 has a prominence 74 that is centrally positioned between the wells 72 in the upper edge 70. The gripping plate 62 has a screw well 76 extending into the prominence 74 and the screw well 76 is oriented parallel with each of the wells 72 in the upper edge 70.

The book holder 44 includes a slide 78 that has a pair of members 80 each slidably extending into a respective one of the wells 72 in the upper edge 70 of the gripping plate 62 and a slide panel 81 that is attached to an exposed end of each of the members 80. The slide 78 has a screw 82 rotatably extending through the slide panel 81 and which extends into the screw well 76 in the upper edge 70 of the gripping plate 62. A knob 84 is attached to the screw 82 associated with the slide 78 thereby facilitating the knob 84 to be gripped for either tightening or loosening the screw 82 associated with the slide 78. The slide panel 81 travels toward the gripping plate 62 when the screw 82 associated with the slide 78 is tightened. Conversely, the slide panel 81 travels away from the gripping plate 62 when the screw 82 associated with the slide 78 is loosened.

The flexible page holder 50 has a first end 86 and a second end 88 and the flexible page holder 50 is elongated between the first end 86 and the second end 88. The flexible page holder 50 is wrapped around a back side 90 of the slide panel 81 having the flexible page holder 50 extending laterally away from each of a first lateral edge 92 and a second lateral edge 94 of the slide panel 81. The flexible page holder 50 is comprised of a bendable material thereby facilitating the flexible page holder 50 to be bent into a variety of shapes. The flexible page holder 50 includes a pair of caps 96 that is each attached to a respective one of the first end 86 and the second end 88 of the flexible page holder 50. In this way each of the caps 96 can abut the respective page 52 of the book 46. The book holder 44 includes a pair of clamps 98 and each the clamps 98 is attached to a respective one of the first lateral edge 92 and the second lateral edge 94 of the slide panel 81. Each of the clamps 98 extends around the flexible page holder 50 to retain the flexible page holder 50 on the slide panel 81. Furthermore, each of the clamps 98 may comprise a hose clamp or other similar type of circular clamp.

In use, the legs 14 are positioned in the deployed position, the book holder 44 is positioned in the deployed position and the tripod 12 is adjusted to a desired height such that the book holder 44 is at eye level for the user 48. The book 46 is positioned on the book holder 44 and the knob 84 on the screw 42 associated with the slide 78 is tightened to compress the book 46 between the base plate 60 and the slide panel 81. Furthermore, the flexible page holder 50 is bent around the book 46 to abut the respective pages 52. In this way the flexible page holder 50 inhibits the respective pages 52 from moving while the user 48 is reading the respective pages 52. The user 48 can position the tripod 12 and the book holder 44 in a preferred orientation to position the book 46 at eye level thereby facilitating the user 48 to read the book 46 in a hands-free manner while the user 48 is seated in a recliner, for example. In this way the user 48 does not have to bend their neck or strain their back in order to look at the book 46 regardless of how their body is positioned. As is most clearly shown in FIG. 6, the flexible page holder 50 can be wrapped around the book holder 44 and the tripod 12 when the book holder 44 is in the collapsed position and the legs 14 of the tripod 12 are in the collapsed position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A book holding assembly for holding a book in an adjustable orientation to facilitate the book to be read hands-free, said assembly comprising:
   a tripod having a plurality of legs being collapsibly disposed on a central pole of said tripod, each of said plurality of legs angling away from said central pole when said plurality of legs is positioned in a deployed position to facilitate said central pole to be vertically oriented on a support surface, each of said legs resting against said central pole when said plurality of legs is positioned in a stored position;
   a cup being coupled said central pole, said cup being directed upwardly on said central pole;
   a book holder being pivotally attached to said cup thereby facilitating said book holder to be positioned at a variety of orientations, said book holder being adjustable to grip a book thereby facilitating the book to be positioned in a preferred orientation for reading wherein said book holder is configured to facilitate a user to read the book in a hands-free manner, said book holder being collapsible into a stored position for storing said book holder, said book holder having a flexible page holder extending away from said book holder, said flexible page holder being bendable into a variety of shapes thereby facilitating each of said flexible page holder to be positioned against respective pages of the book for holding the respective pages in a reading position;
   wherein said central pole comprises a tube slidably receiving a shaft such that said central pole has a telescopically adjustable length, said tripod having a collar extending around said tube, said collar having a plurality of pivot points being distributed around said collar, each of said legs having an upper end being pivotally coupled to a respective one of said pivot points on said collar;
   wherein said cup is disposed on a top end of said shaft having a depression extending into and open end of said cup being directed away from said shaft, said depression having a bounding surface being concavely arcuate with said open end such that said depression has a hemispherical shape, said cup having a slot extending downwardly form said open end toward said bottom of said cup, said slot extending into said depression;
   wherein said assembly includes a lock being movably integrated into said cup, said lock extending into said depression when said lock is manipulated into a locking condition, said lock retracting out of said depression when said lock is manipulated into an unlocked condition; and
   wherein said book holder comprises:
      a ball being positioned in said depression in said cup such that said ball is rotatable in said cup;
      a stem being coupled to and extending away from said cup, said stem extending through said slot in said cup when said book holder is collapsed into said stored position; and
      a grip having a base plate and a gripping plate being pivotally attached to said base plate, said base plate being attached to a distal end of said stem having said base plate lying on a plane being perpendicularly oriented with an axis extending through said distal end of said stem and said ball.

2. The assembly according to claim 1, wherein:
   said gripping plate lies on a plane being perpendicularly oriented with said base plate when said book holder is positioned in a deployed position thereby facilitating the book to be stood upon said base plate having said book resting against said gripping plate;
   said gripping plate lies on said base plate when said book holder is collapsed into said stored position; and
   said base plate has a recess extending into a top surface of said base plate, said gripping plate being positioned in said recess when said book holder is positioned in said stored position.

3. The assembly according to claim 2, wherein said base plate has a pair of feet each extending upwardly from said top surface of said base plate, each of said feet being positioned on opposite sides of said recess from each other and being distally positioned with respect to said gripping plate such that said pair of feet inhibit the book from sliding forwardly off of said top surface of said base plate, said gripping plate having an upper edge.

4. The assembly according to claim 2, wherein said gripping plate has a pair of wells each extending downwardly in said upper edge, said upper edge having a prominence being centrally positioned between said wells in said upper edge, said gripping plate having a screw well extending into said prominence, said screw well being oriented parallel with each of said wells in said upper edge.

5. The assembly according to claim 4, wherein said book holder includes a slide having a pair of members each slidably extending into a respective one of said wells in said upper edge of said gripping plate and a slide panel attached to an exposed end of each of said members.

6. The assembly according to claim 4, wherein said slide has a screw rotatably extending through said slide panel and into said screw well in said upper edge of said gripping plate, said screw associated with said slide having a knob being attached to said screw associated with said slide thereby facilitating said knob to be gripped for either tightening or loosening said screw associated with said slide, said slide panel traveling toward said gripping plate when said screw associated with said slide is tightened, said slide panel traveling away from said gripping plate when said screw associated with said slide is loosened.

7. The assembly according to claim 5, wherein said flexible page holder has a first end and a second end, said flexible page holder being elongated between said first end and said second end, said flexible page holder being wrapped around a back side of said slide panel having said flexible page holder extending laterally away from each of a first lateral edge and a second lateral edge of said slide panel, said flexible page holder being comprised of a bendable material thereby facilitating said flexible page holder to be bend into a variety of shapes, said flexible page holder including a pair of caps each being attached to a respective one of said first end and said second end of said flexible page holder thereby facilitating each of said caps to abut the respective page of the book.

8. The assembly according to claim 7, wherein said book holder includes a pair of clamps, each said clamps being attached to a respective one of said first lateral edge and said second lateral edge of said slide panel, each of said clamps extending around said flexible page holder to retaining said flexible page holder on said slide panel.

9. A book holding assembly for holding a book in an adjustable orientation to facilitate the book to be read hands-free, said assembly comprising:
- a tripod having a plurality of legs being collapsibly disposed on a central pole of said tripod, each of said plurality of legs angling away from said central pole when said plurality of legs is positioned in a deployed position to facilitate said central pole to be vertically oriented on a support surface, each of said legs resting against said central pole when said plurality of legs is positioned in a stored position, said central pole comprising a tube slidably receiving a shaft such that said central pole has a telescopically adjustable length, said tripod having a collar extending around said tube, said collar having a plurality of pivot points being distributed around said collar each of said legs having an upper end being pivotally coupled to a respective one of said pivot points on said collar;
- a cup being coupled said central pole, said cup being directed upwardly on said central pole, said cup being disposed on a top end of said shaft having a depression extending into and open end of said cup being directed away from said shaft, said depression having a bounding surface being concavely arcuate with said open end such that said depression has a hemispherical shape, said cup having a slot extending downwardly form said open end toward said bottom of said cup, said slot extending into said depression;
- a lock being movably integrated into said cup, said lock extending into said depression when said lock is manipulated into a locking condition, said lock retracting out of said depression when said lock is manipulated into an unlocked condition; and
- a book holder being pivotally attached to said cup thereby facilitating said book holder to be positioned at a variety of orientations, said book holder being adjustable to grip a book thereby facilitating the book to be positioned in a preferred orientation for reading wherein said book holder is configured to facilitate a user to read the book in a hands-free manner, said book holder being collapsible into a stored position for storing said book holder, said book holder having a flexible page holder extending away from said book holder, said flexible page holder being bendable into a variety of shapes thereby facilitating each of said flexible page holder to be positioned against respective pages of the book for holding the respective pages in a reading position, said book holder comprising:
- a ball being positioned in said depression in said cup such that said ball is rotatable in said cup;
- a stem being coupled to and extending away from said cup, said stem extending through said slot in said cup when said book holder is collapsed into said stored position;
- a grip having a base plate and a gripping plate being pivotally attached to said base plate, said base plate being attached to a distal end of said stem having said base plate lying on a plane being perpendicularly oriented with an axis extending through said distal end of said stem and said ball, said gripping plate lying on a plane being perpendicularly oriented with said base plate when said book holder is positioned in a deployed position thereby facilitating the book to be stood upon said base plate having said book resting against said gripping plate, said gripping plate lying on said base plate when said book holder is collapsed into said stored position, said base plate having a recess extending into a top surface of said base plate, said gripping plate being positioned in said recess when said book holder is positioned in said stored position, said base plate having a pair of feet each extending upwardly from said top surface of said base plate, each of said feet being positioned on opposite sides of said recess from each other and being distally positioned with respect to said gripping plate such that said pair of feet inhibit the book from sliding forwardly off of said top surface of said base plate, said gripping plate having an upper edge, said gripping plate having a pair of wells each extending downwardly in said upper edge, said upper edge having a prominence being centrally positioned between said welts in said upper edge, said gripping plate having a screw well extending into said prominence, said screw well being oriented parallel with each of said wells in said upper edge;
- a slide having a pair of members each slidably extending into a respective one of said wells in said upper edge of said gripping plate and a slide panel attached to an exposed end of each of said members, said slide has a screw rotatably extending through said slide panel and into said screw well in said upper edge of said gripping plate, said screw associated with said slide having a knob being attached to said screw associated with said slide thereby facilitating said knob to be gripped for either tightening or loosening said screw associated with said slide, said slide panel traveling toward said gripping plate when said screw associated with said slide is tightened, said slide panel traveling away from said gripping plate when said screw associated with said slide is loosened;
- wherein said flexible page holder has a first end and a second end, said flexible page holder being elongated between said first end and said second end, said flexible page holder being wrapped around a back side of said slide panel having said flexible page holder extending laterally away from each of a first lateral edge and a second lateral edge of said slide panel, said flexible page holder being comprised of a bendable material thereby facilitating said flexible page holder to be bend into a variety of shapes, said flexible page holder including a pair of caps each being attached to a respective one of said first end and said second end of said flexible page holder thereby facilitating each of said caps to abut the respective page of the book; and a pair of clamps, each said clamps being attached to a respective one of said first lateral edge and said second lateral edge of said slide panel, each of said clamps extending around said flexible page holder to retaining said flexible page holder on said slide panel.

* * * * *